(12) United States Patent
Pottjegort

(10) Patent No.: US 10,397,623 B2
(45) Date of Patent: Aug. 27, 2019

(54) MONITORING VIDEO ADVERTISEMENTS

(71) Applicant: comScore, Inc., Reston, VA (US)

(72) Inventor: Thomas F. Pottjegort, Ashburn, VA (US)

(73) Assignee: comScore, Inc., Reston, VA (US)

( * ) Notice: Subject to any disclaimer, the term of this patent is extended or adjusted under 35 U.S.C. 154(b) by 0 days.

(21) Appl. No.: 16/046,906

(22) Filed: Jul. 26, 2018

(65) Prior Publication Data

US 2018/0367828 A1 Dec. 20, 2018

Related U.S. Application Data

(62) Division of application No. 14/213,308, filed on Mar. 14, 2014, now Pat. No. 10,063,897.

(60) Provisional application No. 61/794,709, filed on Mar. 15, 2013.

(51) Int. Cl.
*H04H 20/14* (2008.01)
*H04N 21/24* (2011.01)

(52) U.S. Cl.
CPC ............................. *H04N 21/2407* (2013.01)

(58) Field of Classification Search
CPC .................................................. H04N 21/812
See application file for complete search history.

(56) References Cited

U.S. PATENT DOCUMENTS

| | | | |
|---|---|---|---|
| 6,064,376 A | 5/2000 | Berezowski et al. | |
| 6,108,637 A | 8/2000 | Blumenau | |
| 7,386,473 B2 | 6/2008 | Blumenau | |
| 7,590,568 B2 | 9/2009 | Blumenau | |
| 7,613,635 B2 | 11/2009 | Blumenau | |
| 7,644,156 B2 | 1/2010 | Blumenau | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,756,974 B2 | 7/2010 | Blumenau | |

(Continued)

FOREIGN PATENT DOCUMENTS

| | | |
|---|---|---|
| WO | 98/10349 A2 | 3/1998 |
| WO | 20111075886 A1 | 6/2011 |

OTHER PUBLICATIONS

Tinic Uro, "Timing it right", kaourantin.net: Timing it right, Mar. 1, 2010, pp. 1-11, http://www.kaourantin.net/2010/01/timing-it-right.html.

(Continued)

*Primary Examiner* — Gigi L Dubasky
(74) *Attorney, Agent, or Firm* — Baker & Hostetler LLP

(57) ABSTRACT

Techniques for measuring the visibility of video content presented within video players are presented. Initialization code is incorporated within a video player. The initialization code examines metadata associated with video content to determine whether to measure visibility information associated with the video content. If a measurement flag is encountered, the initialization code initializes measurement code to measure visibility information associated with the video content. The measurement code executes to measure visibility information associated with the video content and transmits the visibility information to a measurement server.

19 Claims, 9 Drawing Sheets

(56) References Cited

U.S. PATENT DOCUMENTS

| | | | |
|---|---|---|---|
| 8,429,243 B1* | 4/2013 | Wang | G06F 16/958 709/217 |
| 9,805,377 B2 | 10/2017 | Pottjegort | |
| 9,865,005 B1 | 1/2018 | Pottjegort | |
| 2002/0116494 A1* | 8/2002 | Kocol | G06Q 30/0257 709/224 |
| 2003/0187730 A1* | 10/2003 | Natarajan | G06Q 30/02 705/14.68 |
| 2004/0015608 A1 | 1/2004 | Ellis et al. | |
| 2007/0106787 A1 | 5/2007 | Blumenau | |
| 2007/0106792 A1 | 5/2007 | Blumenau | |
| 2008/0102947 A1* | 5/2008 | Hays | A63F 13/12 463/31 |
| 2008/0109306 A1 | 5/2008 | Maigret et al. | |
| 2008/0114875 A1 | 5/2008 | Anastas et al. | |
| 2008/0301741 A1 | 12/2008 | Stern et al. | |
| 2009/0327869 A1 | 12/2009 | Fan et al. | |
| 2010/0088373 A1* | 4/2010 | Pinkham | G06Q 30/02 709/204 |
| 2010/0235765 A1 | 9/2010 | Worthington | |
| 2010/0299604 A1 | 11/2010 | Blumenau | |
| 2011/0029393 A1* | 2/2011 | Apprendi | G06Q 30/0277 705/14.73 |
| 2011/0035274 A1 | 2/2011 | Goel et al. | |
| 2012/0272256 A1 | 10/2012 | Bedi | |
| 2012/0311627 A1 | 12/2012 | Cho | |
| 2012/0324098 A1 | 12/2012 | De et al. | |
| 2013/0167005 A1 | 6/2013 | Corbett et al. | |
| 2013/0185164 A1 | 7/2013 | Pottjegort | |
| 2013/0227393 A1 | 8/2013 | De et al. | |
| 2013/0291001 A1* | 10/2013 | Besehanic | H04N 21/44204 725/20 |
| 2013/0311309 A1* | 11/2013 | Napchi | G06Q 30/0277 705/14.73 |

OTHER PUBLICATIONS

Non-Final Office Action dated May 27, 2014, U.S. Appl. No. 14/212,363, filed Mar. 14, 2014, pp. 1-16.

Non-Final Office Action dated Nov. 17, 2014, U.S. Appl. No. 13/352,134, filed Jan. 17, 2012, pp. 1-63.

Non-Final Office Action dated Aug. 19, 2016, U.S. Appl. No. 14/212,363, pp. 1-25.

Final Office Action dated Jul. 24, 2015, U.S. Appl. No. 14/212,363, pp. 1-32.

* cited by examiner

MONITORING VIDEO ADVERTISEMENTS

CROSS-REFERENCE TO RELATED APPLICATIONS

This application is a divisional of U.S. patent application Ser. No. 14/213,308, filed Mar. 14, 2014, which claims the benefit of U.S. Provisional Patent App. No. 61/794,709, filed Mar. 15, 2013, both of which are hereby incorporated by reference in their entirety. This application is related to U.S. patent application Ser. No. 13/352,134, filed Jan. 17, 2012, and issued as U.S. Pat. No. 9,805,377, which is also hereby incorporated by reference in its entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or better achieve the objective of their web site. In addition, understanding Internet audience visitation and habits may be useful for informing advertising planning, buying, and selling decisions.

In the area of online advertising, an advertiser, such as a company that is selling goods or services or a non-profit entity advancing a particular cause, pays a website owner, known as a "publisher," to include the advertiser's advertisements into one or more of the publisher's webpages. An advertiser may have its advertisements displayed through multiple publishers or third party advertising networks/brokers, and a publisher may display advertisements from multiple advertisers or third party advertising networks/brokers on any one of its webpages.

FIG. 1 depicts an example of a publisher webpage 120 that includes a plurality of advertisements 131-133. Advertisements 131-133 may comprise static image content, animated image content, interactive content, video content, textual content, or any other kinds of objects or elements that may be used to market products or services. Typically, rather than hosting advertisements 131-133 directly on its server, the publisher will include links or elements (known as "ad-codes") into the hypertext markup language (HTML) of webpage 120. The ad-codes may instruct users' web browsers to retrieve advertisements from ad-servers operated by advertisers or from ad-servers operated by third-party intermediaries, such as advertising networks or brokers. FIG. 1 depicts an exemplary webpage 120 as it might be rendered by a web browser 110 on a client device after having retrieved both the HTML of the webpage from the publisher and advertisements 131-133 from their respective advertisers or third party advertising networks.

In an impression- or view-based advertising compensation model, a publisher may earn a commission from an advertiser each time that a webpage containing an advertisement is viewed by a user. Typically, an advertiser or ad-server will track the number of distinct views by simply counting the total number of hypertext transfer protocol (HTTP) requests made by users to download the advertisement from a server operated by the advertiser or third-party ad network that hosts the advertisement file(s). However, one significant drawback to this approach is that even if an advertisement is downloaded by a browser, it may never actually be displayed in a visible area of its parent webpage and, thus, could not actually be viewable by a user.

For example, FIG. 2 depicts publisher webpage 120 in its entirety—that is, representing all of the content encoded in its corresponding HTML file. FIG. 2 also depicts the viewport 112 of browser 110 in the form of a dashed-line box. Viewport 112 may represent the portion of webpage 120 that is being displayed in or otherwise in focus within browser 110 at any given time. By comparing FIGS. 1 and 2, it can be seen that viewport 112 encompasses only a portion of webpage 120, with the rest of the page running outside the visible area of the browser, a phenomenon sometimes referred to as "page-clipping." For example, although advertisements 134 and 135 are also included within webpage 120, these advertisements will not be displayed in viewport 112 unless a user instructs browser 110 to scroll downward.

Moreover, even if an advertisement is contained within the viewport of a browser, there may be other reasons why it may nevertheless not be visible on a client device screen. For example, as depicted in FIG. 3, in some operating systems, the window of browser 110 may be positioned within a graphical user interface (GUI) desktop 300 such that a portion of the window runs off of the visible area of the device screen, a phenomenon sometimes referred to as "screen-clipping." In the example of FIG. 3, even if advertisements 131-133 were within the viewport of browser 110, such advertisements might never be displayed to a user if they were positioned only within a screen-clipped area of the viewport.

Similarly, as depicted in FIG. 4, objects within a webpage might not be visible to a user, even if they are included in the viewport of the browser, if they are positioned within an area of the viewport that is obscured by another window or object. For example, as depicted in FIG. 4, although advertisements 131-133 are within the viewport of browser 110, only advertisement 133 is visible, advertisements 131 and 132 being obscured by another window 400.

An advertisement may not be visible, or fully visible, on a device screen for other reasons, despite having been downloaded by a browser. For example, a webpage may be downloaded and rendered in a separate browser window or tab that the user never brings to the foreground, or an advertisement may be contained within an area of a publisher webpage that has smaller dimensions than the dimension of the advertisement, in which case the advertisement may be only partially displayed.

In any of these and other cases in which an advertisement is downloaded but not displayed, or not fully displayed, on a client device screen, an advertiser or third-party ad network may nevertheless credit the publisher with a view, since the client device requested the advertisement from the ad-server, even though the advertisement was never fully displayed. As a result, advertisers may pay commissions for a significant number of downloaded advertisements that were never actually visible (or could never have been visible) to users. This could result in advertisers being susceptible to fraudulent activity designed to illegitimately increase impression counts without actually displaying the requested advertisements to end-users.

Various techniques have been proposed for determining accurate view-counts for electronic advertisements that do not rely merely on download statistics, but are also able to determine whether electronic advertisements have been displayed in a viewable area of client device screens and how end-users interact with those advertisements. However, these techniques are designed for static advertisements and advertisements that are the only thing displayed in their window, frame, or area of the screen, and such techniques do not properly account for the measurement of video advertisements presented within a video player on a webpage.

For example, a third party measurement entity may be able to determine whether the container containing the video player is within a viewable portion of the client device, but it does not have access to the video player itself in order to determine the state of the player and whether or when the player is displaying advertising. Accordingly, the third party measurement entity may not even know whether the video player successfully loaded or not. Furthermore, because of limited access to the video player, a third party measurement entity is not be able to determine whether the portion of the video player that displays the video content (as opposed to, for example, displaying video controls such as a play or pause control) is actually visible on the client screen or not. Additionally, because of limited access into the video player, conventional techniques cannot determine when a video advertisement is actually played or when the video advertisement stops. Further still, due to layered and opaque relationships between video content providers and video advertising providers, conventional techniques cannot determine which particular video advertisement is actually played within a video player.

Thus, online advertising may be improved by techniques that enable the monitoring of the visibility of video advertising content on a client device.

SUMMARY

The present disclosure addresses these and other improvements to online advertising. In some embodiments, initialization code may be incorporated into video advertising content that is downloaded by a client device. The initialization code may determine whether visibility information associated with video content should be measured and, if so, may execute measurement code to measure the visibility information. The initialization code may be incorporated into a video player or embedded within other content associated with a web page. The initialization code may be hard-coded or dynamically loaded. Once executed, the initialization code may review metadata associated with video content to be played within the video player in order to determine whether to measure visibility information associated with the video content.

The metadata associated with the video content may include information associated with video advertising to be played within the video player. The metadata associated with the video content may also include additional information regarding the video advertising to be played, including: an identifier identifying the video advertisement to be played, the URL or other address information regarding where the video advertisement is located, when to begin displaying the video advertisement, the duration of the video advertisement, the size of the video advertisement, or the size of the video player itself. The metadata associated with the video content may also include event callback instructions to be executed when certain events occur in relation to the video advertisement. In some embodiments the event callback instructions may include instructions to be executed when the video advertisement begins playing, when the video advertisement has played halfway, and/or when the video advertisement has finished playing.

In some embodiments, if a content provider desires measurement of the visibility of its video content, the content provider may include at least one measurement flag, or other indicators, within the metadata associated with the video content. In some embodiments the measurement flag may be a parameter included in the URL or address of the video content and/or in the event callback instructions associated with the video content. In one embodiment, the initialization code determines whether visibility information associated with the video content should be measured by searching for the measurement flag within the metadata associated with the video content.

In one embodiment, the first time that the initialization code encounters a measurement flag within the metadata associated with the video content, the initialization code initializes measurement code to determine the visibility of the video content on the display screen of the client device and report that information to a measurement server. The measurement code may be included in the initialization code or may be downloaded from a measurement code server. In some embodiments the measurement code may only execute to measure visibility when certain events occur in relation to the video content. In some embodiments the measurement code may only execute when an event occurs in relation to the video content whose associated event callback instruction includes a measurement marker. For example, in some embodiments the measurement code may only execute to measure visibility information associated with the video content when the video content begins playing and the associated start event callback instruction includes a measurement flag; when the video content reaches its midpoint in duration and the associated midpoint event callback instruction includes a measurement flag, or when the video content ends and the associated completed event callback instruction includes a measurement flag.

In some embodiments when a video player encounters an event callback instruction that includes a measurement flag, the video player may pass the callback instruction to the initialization code. The initialization code may parse through the event callback instruction and extract context information associated with the event and the video content. In some embodiments the context information may include information regarding the size and offset of the video content associated with the event callback instruction or the duration of the video content at the time of the event. The initialization code may pass the extracted context information to the measurement code. The measurement code may use the context information in order to determine visibility information associated with the video content and transmit the visibility information to a measurement server.

In some embodiments, the measurement server may generate reports using the visibility information generated by the measurement code. The reports may provide a variety of metrics associated with the visibility of the video content. The reports may be provided to or accessed by a video content provider.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
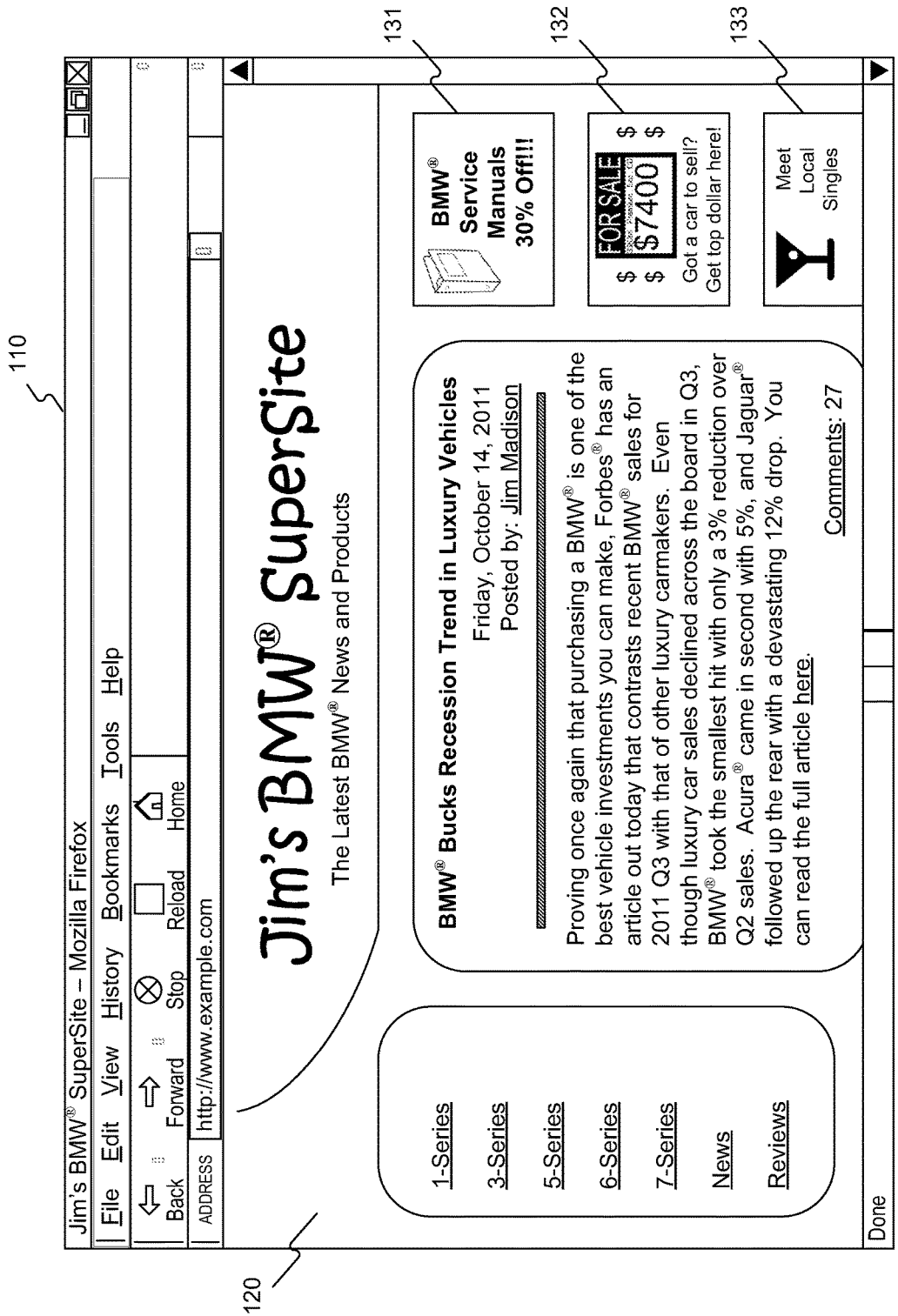
FIG. 1 is a diagram depicting an exemplary publisher webpage that includes third-party advertisements, as rendered by a web browser and displayed on a client device screen.
Figure 2:
FIG. 2 is a diagram depicting an exemplary comparison between a publisher webpage that includes third-party advertisements and a web browser viewport.
Figure 3:
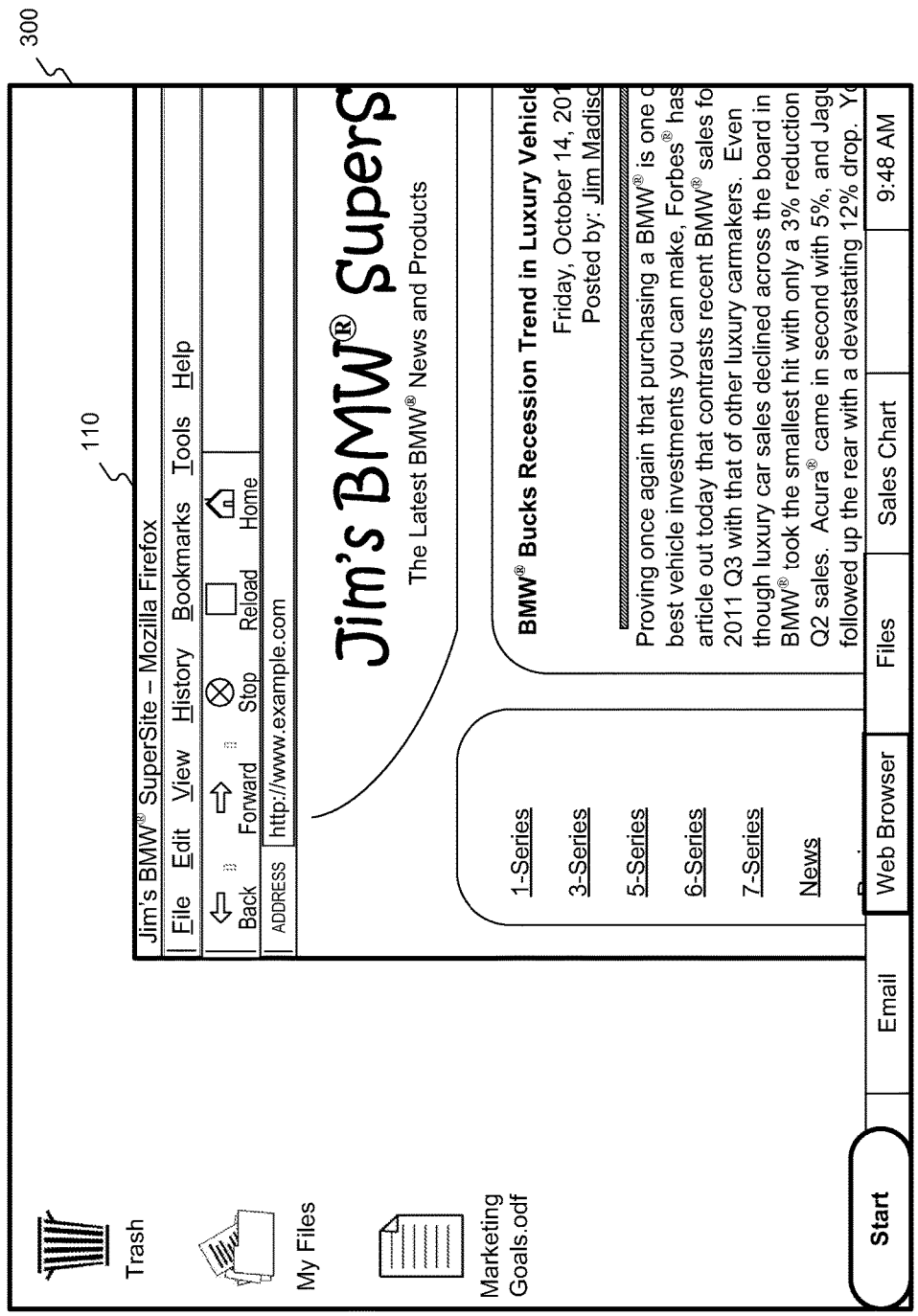
FIG. 3 is a diagram depicting an exemplary screen-clipping occurrence in which a portion of a web browser viewport has been positioned outside of the viewable screen area of a client device.
Figure 4:
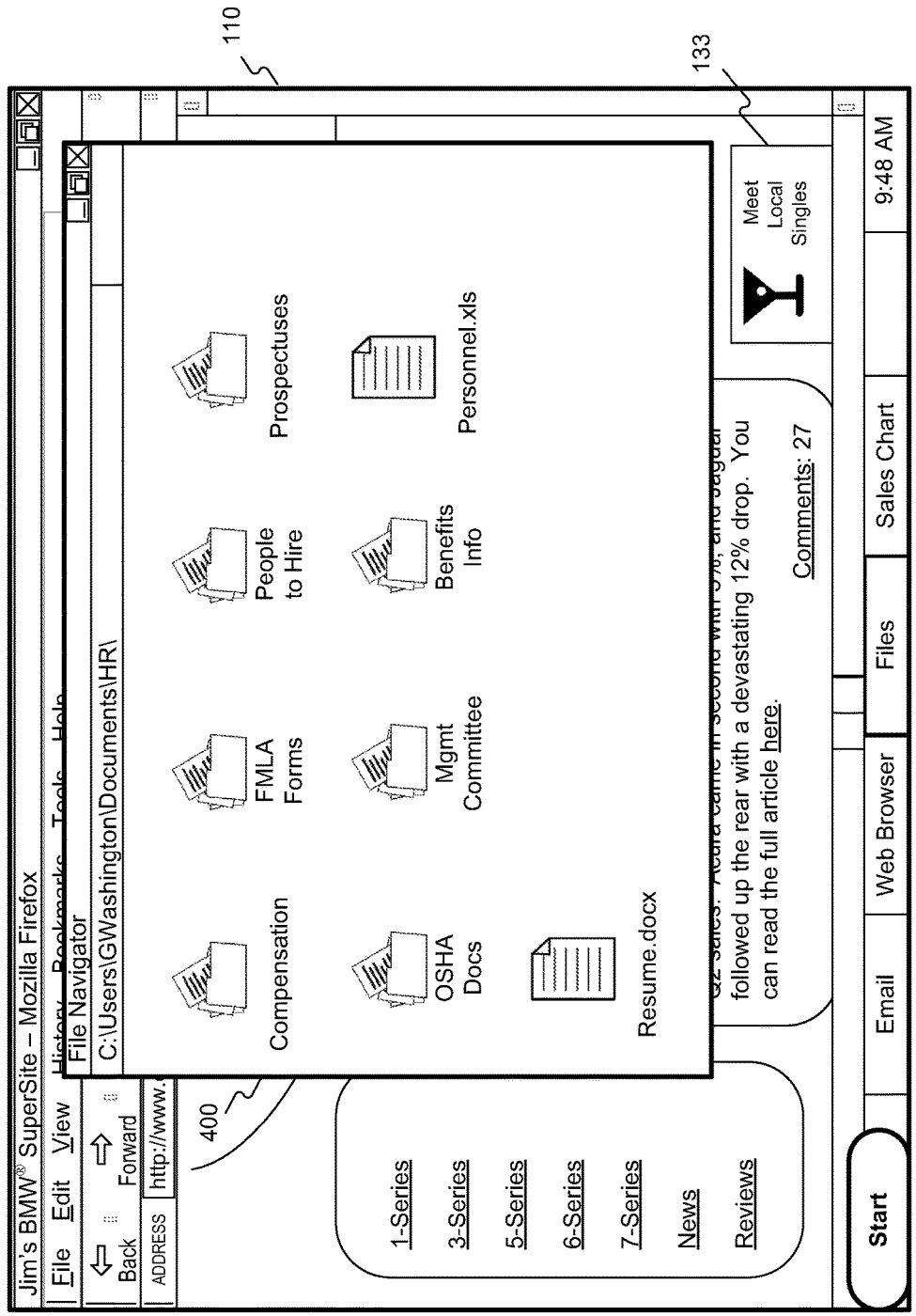
FIG. 4 is a diagram depicting an exemplary window arrangement in which a portion of a web browser viewport has been obscured by another GUI window.

The following detailed description refers to the accompanying drawings. Wherever convenient, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims. In the following detailed description and in the accompanying drawings, all trademarks belong to their designated owners and are used in this application solely for illustration or technical description purposes.

Figure 5:
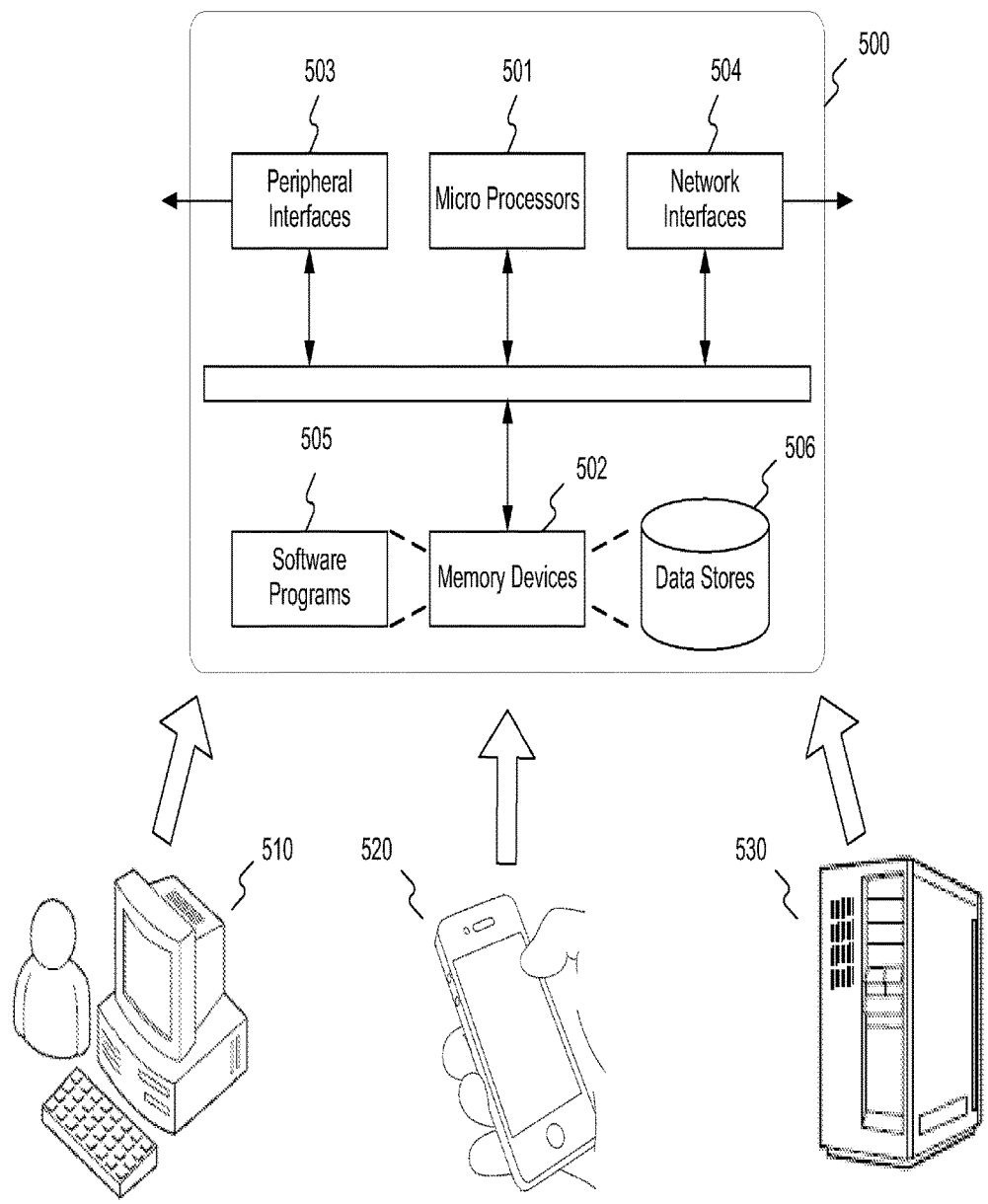
FIG. 5 is a diagram depicting an exemplary hardware configuration for various devices that may be used to perform one or more operations of the described embodiments, consistent with certain disclosed embodiments.

FIG. 5 is a diagram depicting an exemplary hardware configuration for various devices that may be used to perform one or more operations of the described embodiments. As further described below, operations for determining the visibility of an advertisement on a client device may be performed by the client device itself, which may be, for example, a traditional personal computing device 510, such as a desktop or laptop computer, a mobile device 520, such as a smartphone or tablet, a kiosk terminal, a global position system (GPS) device, etc. The client device may receive client-side code for performing ad-visibility determinations from one or more external devices 530, such as a web server involved in serving webpages, advertisements, or ad-codes to the client device.

Any of devices 510-530 may comprise one or more microprocessors 501 of varying core configurations and clock frequencies; one or more memory devices or computer-readable media 502 of varying physical dimensions and storage capacities, such as flash drives, hard drives, random access memory, etc., for storing data, such as images, files, and program instructions for execution by one or more microprocessors 501; one or more network interfaces 504, such as Ethernet adapters, wireless transceivers, or serial network components, for communicating over wired or wireless media using protocols, such as Ethernet, wireless Ethernet, code divisional multiple access (CDMA), time division multiple access (TDMA), etc.; and one or more peripheral interfaces 503, such as keyboards, mice, touchpads, computer screens, touchscreens, etc., for enabling human interaction with and manipulation of devices 510, 520, or 530. In some embodiments, the components of devices 510, 520, or 530 need not be enclosed within a single enclosure or even located in close proximity to one another.

Memory devices 502 may further be physically or logically arranged or configured to provide for or store one or more data stores 506, such as one or more file systems or databases, and one or more software programs 505, which may contain interpretable or executable instructions for performing one or more of the disclosed embodiments. Those skilled in the art will appreciate that the above-described componentry is exemplary only, as devices 510, 520, and 530 may comprise any type of hardware componentry, including any necessary accompanying firmware or software, for performing the disclosed embodiments. Devices 510, 520, or 530 may also be implemented in part or in whole by electronic circuit components or processors, such as application-specific integrated circuits (ASICs) or field-programmable gate arrays (FPGAs).

Figure 6:
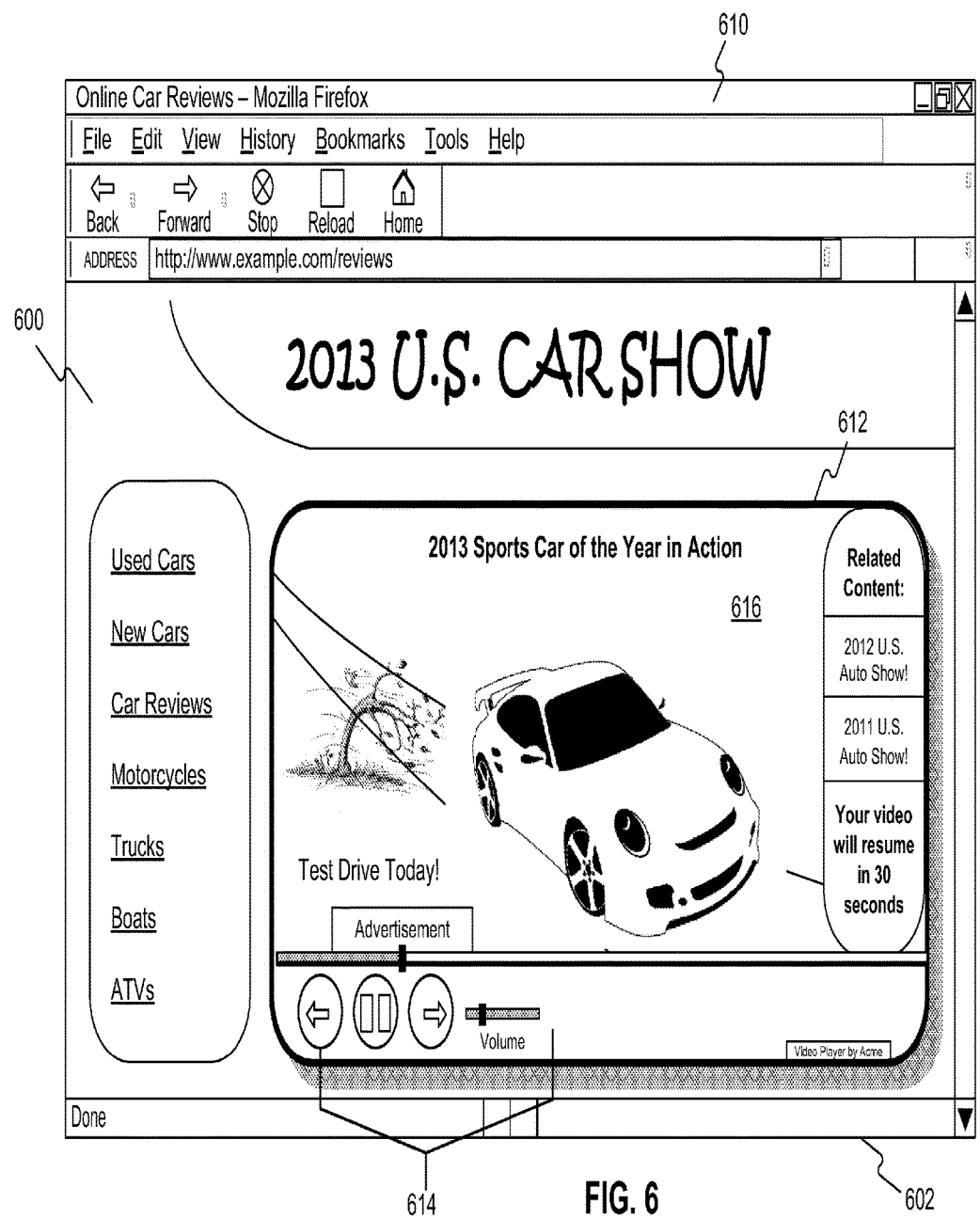
FIG. 6 is a diagram depicting an exemplary publisher webpage that includes a video player which plays video advertising.

FIG. 6 is a diagram depicting an exemplary publisher webpage 600 that includes a video player 612 configured to play video content such as, for example, video advertisements. The publisher webpage 600 is rendered by a web browser 610 on a client device and displayed on the screen of the client device. The publisher page 600 may include instructions for embedding the video player 612 as part of the content to be displayed on the page. The video player 612 may be a separate component that is downloaded and executed by the web browser 610, such as an Adobe Flash, Apple Quicktime, or Microsoft Silverlight object, may be a component of the web browser 610 itself, such as a HTML 5.0 video player, or may be any other type of component able to render and play video content within the web browser 610. The video player 612 may include various components within its user interface, such as a video controls 614 for controlling playback of video content played by the video player 612. The video player 612 may also have a video pane 616 that is reserved for displaying video content. The video pane 616 may be partially or completely obstructed by video controls 614, depending on the user interface design of the video player 612. The video player may have the capability of downloading and playing video content, including video advertisements, within the player. The video content may be presented within the video pane 616 or may be presented in other areas within the video player 612.

Figure 7:
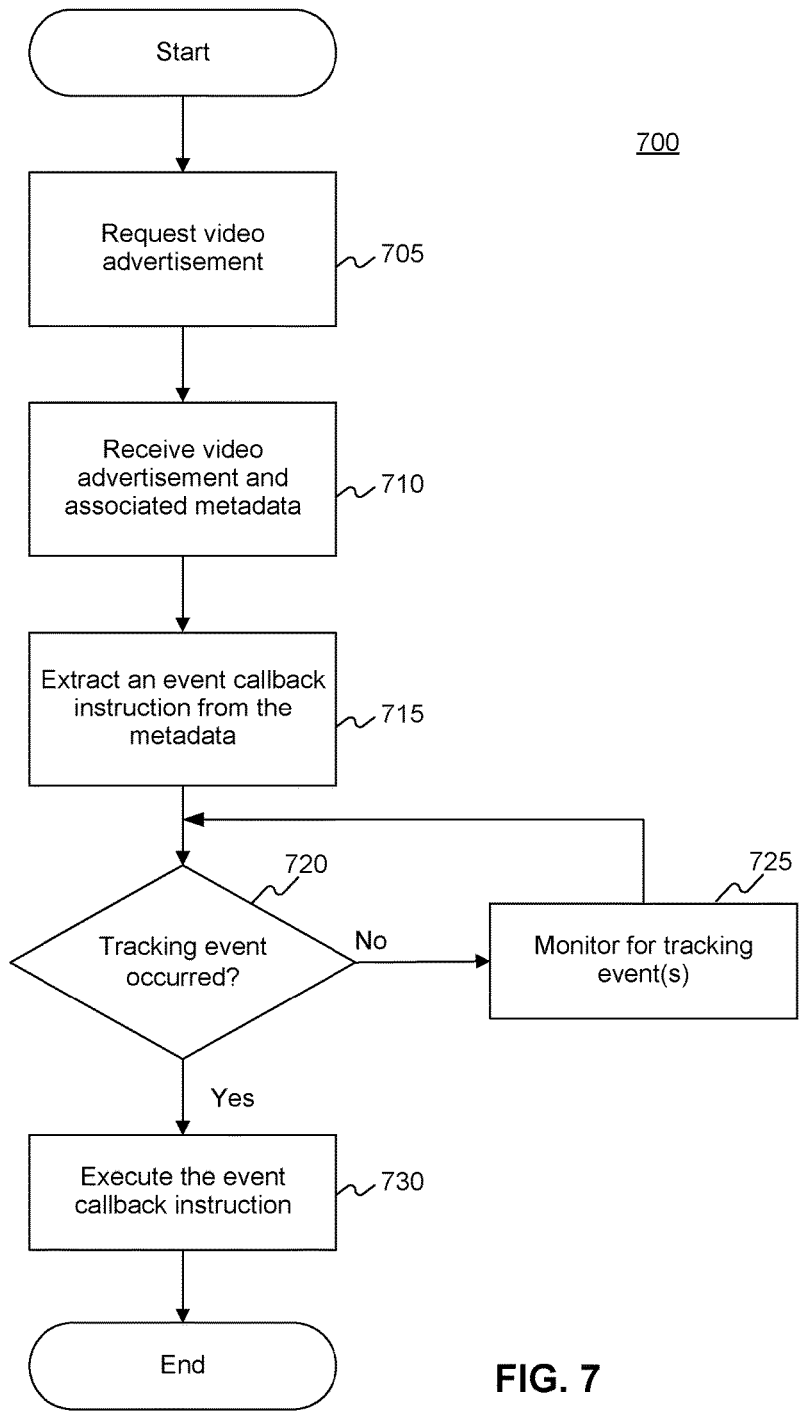
FIG. 7 shows an example of a process for measuring visibility of video playing on a web page, consistent with embodiments of the invention.

FIG. 7 illustrates an example of a process 700 for monitoring the visibility of video advertisements, consistent with the principles of the invention. In various embodiments, the process 700 may be implemented by a video player, such as video player 612. In one embodiment the video player 612 may be configured to play featured video content as well as video advertisements, also known as video ad creatives, or just creatives. The video player 612 may play video advertisements at various times such as, for example, before the playback of the featured video content, after the playback of the featured video content, at some time in the middle of the playback of the featured video content, or concurrently with the playback of the featured video content. The video advertisement may be hosted by an ad-server or by a content delivery network.

As shown in FIG. 7 at stage 705 of process 700, the video player 612 may request the video advertisement, for example, directly from an ad-server or a content delivery network, or it may request a video advertisement from a third party video ad network/broker. The selection of the video advertisement to be played may be based on a variety of criteria, including the topical classification of the publisher page displaying the video player, demographic information associated with the user, the topical classification of the publisher page, the topical or demographic classification of the featured video content and/or any other form of criteria. In some embodiments, the criteria used to select the video advertisement to be played may be provided by the content publisher of the webpage.

In various embodiments, as shown at stage 710 of FIG. 7, the video player 612 may receive metadata associated with the video advertisement. In some embodiments the metadata may be received along with the video advertisement creative itself. For example, the metadata may be received as part of a file generated in accordance with the Video Ad Serving Template (VAST) protocol. In another embodiment the metadata may be included as part of a Video Player-Ad Interface Definition (VPAID) file instead of, or in addition to, a VAST file. In yet other embodiments, the metadata information may be received separately in advance of or after receipt of the video advertisement creative. In other embodiments the metadata information may be included as parameters in a URI or address associated with the video advertising creative, such as either the URI or address of the creative itself or the URI or address of a server that may be in the communication chain leading to the creative.

In some embodiments the metadata information associated with the video content may include event callback instructions, which the video player extracts or recognizes, as shown at stage 715 of process 700. In some embodiments the video player 612 may be configured to execute the event callback instructions when certain events associated with video content occur, as illustrated by stages 720 Yes, and 730 of process 700. For example, a VAST file may contain tracking URIs to be requested when certain tracking events occur. Tracking events may be events related to the playing of the video advertisement, such as when playback of the video advertisement begins, when at least 25% of the video advertisement has been played, when at least 50% of the video advertisement has been played, when at least 75% of the video advertisement has been played, when the complete video advertisement has been played at normal speed, etc. Tracking events may also include events related to user interaction with the video player during the playing of the video advertisement, such as pausing the playback of the video advertisement, unpausing or resuming playback of the video advertisement, fast forwarding during the playing of the video advertisement, etc.

At stage 730, when a tracking event associated with an event callback instruction occurs, the video player 612 may execute the event callback instruction. For example, if a VAST file associated with a video advertisement and containing a tracking URI to be requested when a video advertisement begins (i.e., the tracking event) is received by the video player 612, the video player 612 may generate a request to the tracking URI (i.e., execute the event callback instruction) when it begins playing the video advertisement.

In some embodiments, the video player 612 may parse through the metadata information once it is received. For example, the video player 612 may parse through a received VAST file in order to confirm that the file conforms to the VAST formatting standards, does not contain missing parts, or does not contain other errors.

Figure 8:
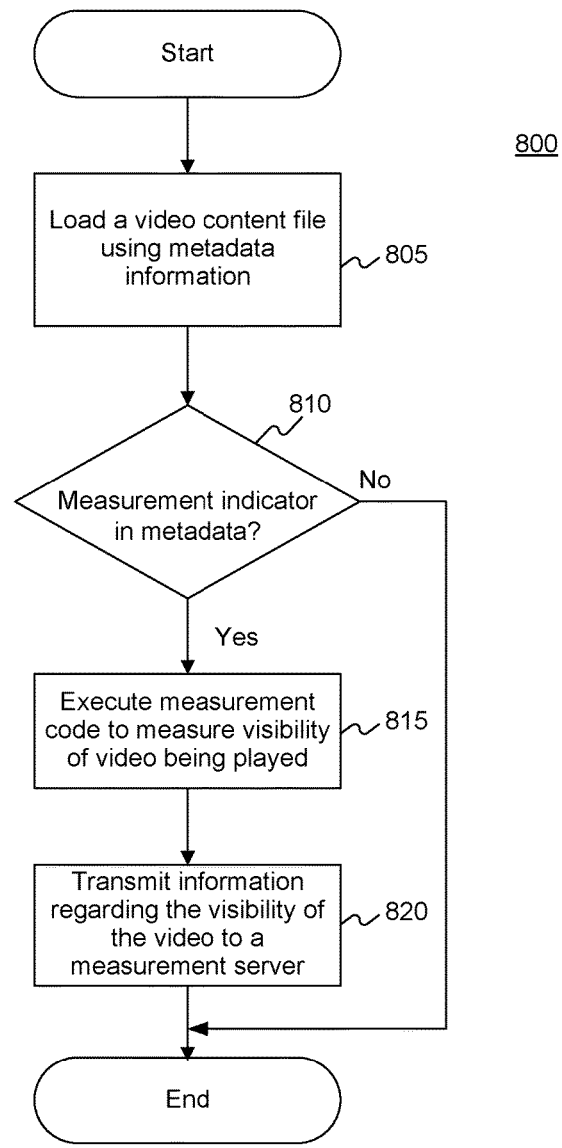
FIG. 8 shows another example of a process for measuring visibility of video playing on a web page, consistent with embodiments of the invention.

FIG. 8 illustrates an example of a process 800 for monitoring the visibility of video advertisements, consistent with the principles of the invention. In various embodiments, the process 800 may be implemented by a video player, such as video player 612. In some embodiments, as shown at stage 805 of process 800, once parsed the video player 612 may use the metadata information to load the video content file. Loading the video content file may include preparing the video content for playback and creating event callbacks based on event callback instructions received as part of the metadata information.

In one embodiment of the present invention, the video player 612 may execute initialization code when loading the video content file using the metadata information. As shown at stage 810 of process 800, the initialization code may determine whether visibility information associated with video content should be measured and, if so, may execute measurement code to measure the visibility information, as shown at stage 815. In one embodiment, the initialization code may be hard-coded into video player 612 such that it is part of the logic of the video player 612. In another embodiment, the video player 612 may dynamically load the initialization code by either requesting the initialization code from an initialization code server or by dynamically generating the initialization code itself. In another embodiment the initialization code may be embedded within other content associated with the publisher webpage 600. The initialization code may be provided by the developer of the video player 612 or may be provided by any other party for integration into video player 612.

In one embodiment, if the visibility of a particular item of video content is to be measured, at least one or more measurement flags, or other indicators, may be included within the metadata associated with the video content (see stage 810). The measurement flags may be provided by the video content provider, such as an advertiser, or may be included by any other party desiring to measure the visibility of the video content.

In alternate embodiments, stage 810 may not be limited to determining whether there is a measurement flag only in the metadata. While in the embodiment shown in FIG. 8, the measurement flag may be a distinct data structure within the metadata information associated with the video content, alternatively, or in additional embodiments, the measurement flag may consist of one or more parameters included in the URI or address of the video content and/or in the event callback instructions associated with the video content. In one embodiment, for example, the measurement flag may be one or more parameters included within a tracking URI associated with an event in a VAST file associated with a video advertisement. In another embodiment, the measurement flag may be one or more parameters included within a URI or address associated with the video advertising creative, such as either the URI or address of the creative itself or the URI or address of a server that may be in the communication chain leading to the creative.

In one embodiment, the initialization code may review metadata associated with video content to be played within the video player in order to determine whether to measure visibility information associated with the video content (stage 805). The initialization code may determine whether visibility information associated with the video content should be measured by searching for a measurement flag when parsing metadata information associated with the video content (stage 810). For example, the initialization code may search for a measurement flag while it parses through a VAST file associated with a video advertisement. If a measurement flag is located, the initialization code may initialize and load measurement code for measuring visibility information associated with the video content (stage 815).

In one embodiment, the first time that the initialization code encounters a measurement flag within the metadata associated with the video content, the initialization code initializes measurement code to determine visibility information associated with the video content displayed on the display screen of the client device. The measurement code may be part of the initialization code or may be a separate component or module. The measurement code may be hard-coded into the video player 612 and/or the video creative. The measurement code may be separately downloaded from a measurement code server. Measurement code can be a compiled and executable file, an uncompiled script such as, for example, a JavaScript file, or any other set of instructions that can be executed by video player 612 or web browser 610.

The initialization of the measurement code may include loading the measurement code. Loading the measurement code may include downloading the measurement code from a measurement code server. In some embodiments, the measurement code provided by a measurement code server may be customized based on certain criteria such as, for example, the type and version of video player 612, the type and version of web browser 610, or information regarding the publisher webpage 600. Loading the measurement code may also include inserting the measurement code into the Document Object Model (DOM) tree associated with the publisher webpage 610, for example by creating a new DOM object associated with the video player 612. In some embodiments, as part of the initialization of the measurement code, the initialization code may generate a unique identifier for the video player 612 and associate it to the video player 612, for example, by modifying a DOM property associated with the video player 612 to include the unique identifier. Any other method of associating the unique identifier to the video player 612 may be utilized. In some embodiments, the initialization code may pass the unique identifier to the measurement code, for example, by appending the unique identifier after a hash ("#") symbol in the URI associated with the request for the measurement code. The measurement code may use the unique identifier to locate the video player 612 such as, for example, by searching for the object containing the unique identifier within the DOM tree associated with the publisher webpage 600.

In some embodiments the initialization of the measurement code may include initializing data structures associated with measuring visibility information associated with the video content. In some embodiments the initialization code may pass information to the measurement code upon initialization of the measurement code. For example, the initialization code may pass information regarding the type and version of the video player 612, the name of the developer of the video player, etc. In some embodiments this information may be passed as parameters in the URI associated with the request for the measurement code. In some embodiments this information may be used by the measurement code server to determine the type of measurement code to transmit to the client device.

In some embodiments the measurement code may utilize the techniques and methods described in co-pending U.S. patent application Ser. No. 13/352,134, filed on 17 Jan. 2012, which is incorporated by reference in its entirety, to measure viewability of video content.

In some embodiments of stage 815, once initialized the measurement code may execute during the playback of the video content to measure visibility information associated with the video content. The measurement code may measure visibility information associated with the video content throughout the entire duration of the video content or may execute intermittently during certain parts of the playback of the video content. For example, the measurement code may execute to measure visibility information during the playback of the first 50% of the video content duration or during only the first few seconds of the playback of the video content.

In some embodiments the measurement code may only execute to measure visibility when certain events occur in relation to the video content, such as a tracking event as described above with respect to FIG. 7. The measurement code may execute when an event occurs whose associated event callback instruction includes a measurement marker. For example, the measurement code may execute to measure visibility information when video content begins playing and a start playback event callback instruction includes a measurement flag; when the video content playback reaches its duration midpoint and the associated playback midpoint event callback instruction includes a measurement flag; or when the video content ends playback and the associated playback completed event callback instruction includes a measurement flag. In one embodiment the measurement code may execute when a tracking URI associated with a tracking event in a VAST file includes a measurement flag. For example, the measurement code may execute to measure visibility information when video content playback begins and the "start" tracking event URI includes a measurement flag; when video content has played for at least 25% of the total duration and the "firstQuartile" tracking event URI includes a measurement flag; when video content has played for at least 50% of total duration and the "midpoint" tracking event URI includes a measurement flag; when video content has played for at least 75% of total duration and the "thirdQuartile" tracking event URI includes a measurement flag, or when the video content has played to the end at normal speed and the "complete" tracking event URI includes a measurement flag.

In some embodiments when initialization code encounters an event callback instruction that includes a measurement flag, the initialization code may parse through the event callback instruction and extract context information associated with the event and the video content. The context information may include information describing the event that occurred, and the URI of content associated with the event, such as publisher page 600. The context information may also include information regarding the size and offset of the video content associated with the event callback instruction. The context information may additionally or alternatively include other information, such as the duration of the video content at the time of the event, the volume of the video playback at the time of the event, an indication of whether the video content was being played in full-screen mode or not, the state of the video player (e.g., whether it is operating in limited mode or in full-feature mode), etc. The initialization code may pass the extracted context information to the measurement code.

In some embodiments the measurement code may use the context information in order to determine visibility information associated with the video content. For example, the measurement code may use received size and offset information to determine the location of the video player 612 and determine the visibility of the video player 612 on the screen of the client device. In some embodiments the measurement code may use information regarding the type and version of the video player and/or the state of the video player to determine the location of video pane 616 and determine the visibility of the video pane 616 on the screen of the client device. Other context information may be similarly used to determine visibility information associated with the video content.

In some embodiments, as shown at stage 820 of FIG. 8, the measurement code may transmit visibility information associated with the video content to a measurement server. The measurement code may transmit visibility information every time an event is triggered. Alternatively, or additionally, the measurement code may accumulate and log visibility information and transmit the logged information to a measurement. In some embodiments, the measurement code may pre-process visibility information to detect and correct errors before transmitting the visibility information to the measurement server.

In some embodiments the visibility information generated by the measurement code can be used to determine whether video content met a predetermined visibility threshold in order to be classified as "viewable." This determination may be performed by the measurement code, initialization code, video player 612, measurement server, or any other entity or process. This determination may include determining whether a certain portion or percentage of the video content was visible on the display screen of the client device. In addition to, or alternatively, this determination may include determining whether the video content was played for a minimum threshold amount of time on the client device. Any other criteria may be used to establish the predetermined visibility threshold.

In some embodiments a user interface may be provided that allows users to view reports generated using the visibility information associated with the video content. In some embodiments the user interface may allow users to generate reports using the visibility information associated with the video content. The reports may provide a variety of metrics associated with the visibility of the video content. The reports may be provided to or accessed by a video content provider.

Figure 9:
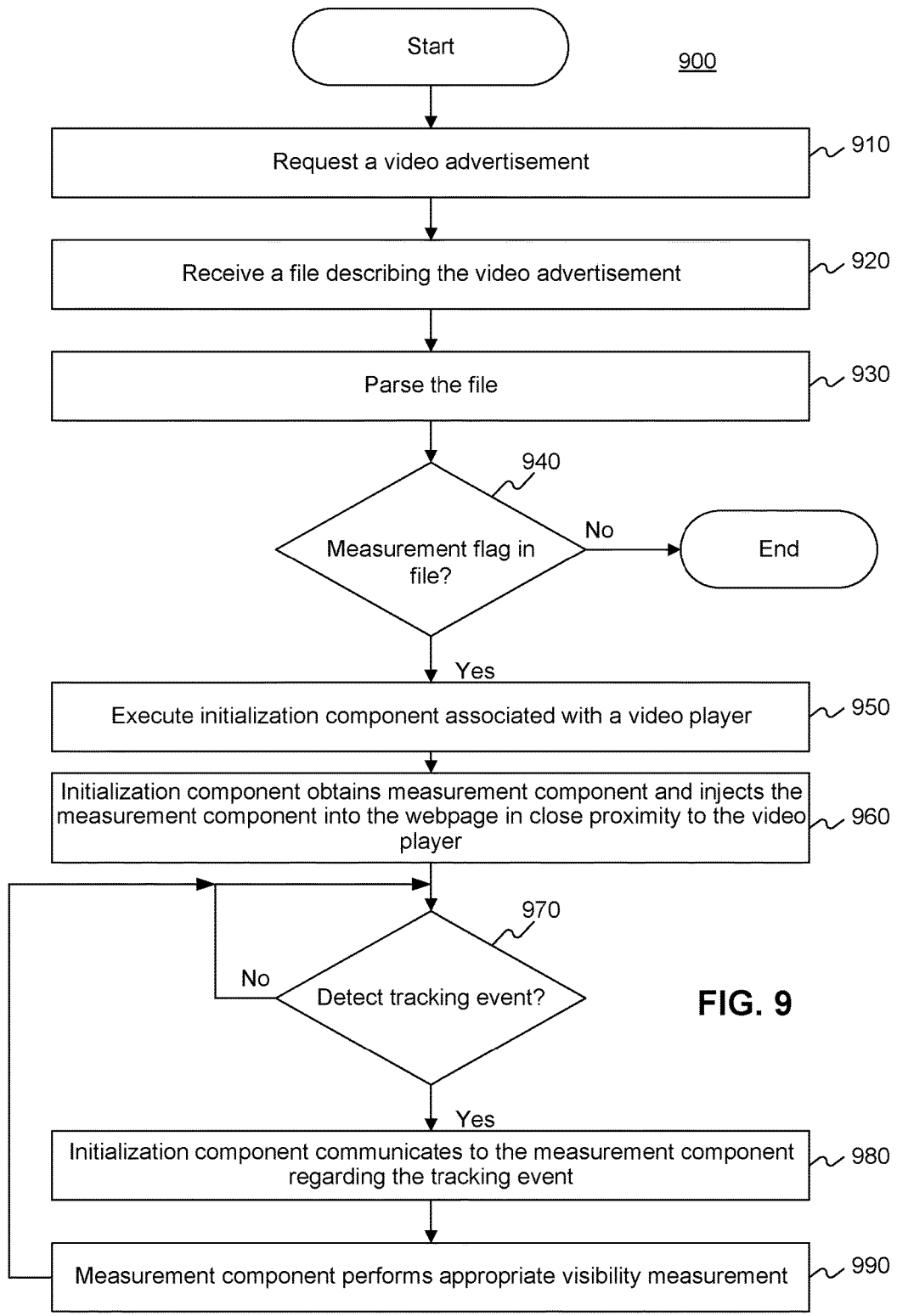
FIG. 9 shows yet another example of a process for measuring visibility of video playing on a web page, consistent with embodiments of the invention.

FIG. 9 shows an example of a process 900 for measuring visibility of video playing on a web page, consistent with embodiments of the invention. In various embodiments, process 900 may be implemented by program code that is part of a video player, such as video player 612. In the embodiment shown, process 900 begins by requesting a video advertisement or video ad (stage 910). In various embodiments, a video player may include an executing component that is provided by an advertising network that operates to implement VPAID and VAST functionality, including requesting video ads at appropriate times.

At stage 920, process 900 receives a file describing the video ad. In various embodiments, this may be an XML file, such as a VAST file. In various embodiments, the file describing the video ad may include information specifying the content to be played and the data to be measured. The exemplary XML file may include, for example, information specifying a tracking URI start event, midpoint event and complete event. In other words, the file may describe what information to measure and when to measure that information. The tracking URI may be a URI associated with a measurement server for gathering data on the start, midpoint and complete events. The XML file may also include the URI where the video player can retrieve or access the video ad content. In various embodiments the video ad content can be an MP4 file or the like. In some embodiments, the XML file may point to, or be chained to, another XML file that contains additional information and/or the URI of the video ad, etc.

In some embodiments, from the video player's point of view, the file describing the video ad is treated like a playlist, which tells the video player when to request, for example, a "start" tracking URI; when to execute or play the video ad content; when to request the "complete" tracking URL, etc.

At stage 930, process 900 includes parsing the received file. In various embodiments, this stage may include finding and scheduling for processing the tracking URIs and associated events, the video ad content, etc.

Process 900 next determines whether there is at least one measurement flag, or other indicator, in the received file (stage 940). In various embodiments, this may be a simple flag or unique parameter value. In various embodiments, the measurement flag informs the video player whether to measure the visibility of the video ad content associated with the file. The visibility marker may be included in the file describing the video ad (e.g., a VAST XML file) by the advertiser, for the purpose of signaling that the advertiser desires to have the visibility of the video ad accurately measured.

If there is no measurement flag in the received file (stage 940, No), then process 900 ends, as there is no need to perform a visibility measurement.

If, on the other hand, there is a measurement flag in the received file (stage 940, Yes), then process 900 executes an initialization component associated with the video player (stage 950). In various embodiments, the initialization component associated with the video player will not be executed, or perhaps even loaded, unless the measurement flag is encountered. In various embodiments, the initialization component is a set of instructions associated with the video player for the purpose of implementing and coordinating visibility measurement functionality between the video ad content being played by the video player and its associated publisher web page.

At stage 960, the initialization component associated with the video player obtains a measurement component (e.g., by downloading it) and injects the measurement component into the web page in close proximity to the video player. For example, the initialization component may generate a URI request for the measurement component (which may, for example, be a JavaScript that performs visibility measurements) and then inject the measurement component into the publisher webpage right below (or elsewhere close to or on) the video player. For example, the measurement component may be injected somewhere in the DOM tree in close relationship to the container that holds the video player.

In some embodiments, after being injected into the web page, the measurement component may be initialized, which may include sending a message indicating that it has successfully loaded and is executing. In various embodiments, the injected measurement component must be successfully injected and initialized before the video ad content playback starts, because the initialization takes time that must be accounted for before visibility measurement begins.

If the injection fails (e.g., when the video player is running on a web page that does not permit JavaScript access), then there will be no "load successful" message and the initialization component may report to a remote measurement server that the injection failed.

At stage 970, process 900 determines whether a tracking event has been detected. If a tracking event is not detected (stage 970, No), then process 900 loops and continues attempting to detect a tracking event.

If, on the other hand, a tracking event is detected (stage 970, Yes), then process 900 proceeds to stage 980. In various embodiments, the tracking events (e.g., the start of playback of the video ad content) are defined in the received file describing the video ad, and the video player detects the occurrence of these events. As described above, when a tracking event occurs, the video player may make a request to a tracking URI associated with the event. In the case where a measurement flag is included in the video ad file (stage 940, Yes), instead of making the request to the tracking URI, the video player instead communicates the occurrence of the event to the initialization component, including, in some embodiments, passing the tracking URI to the initialization component.

At stage 980, the initialization component communicates the tracking event to the measurement component (e.g., the injected JavaScript running on the web page). Because the tracking event is communicated to it, the measurement component knows the current status of the video ad—e.g., that the video ad content playback is starting, is at a midpoint, is ended, etc.

At stage 990, the measurement component performs appropriate visibility measurements, after which process 900 loops back to detect further tracking events at stage 970. In general, the measurement component measures whether the video ad content was visible during playback, for example, by measuring whether the video player was visible at the time the tracking events occurred. In various embodiments, the measurement component may measure visibility and duration of the video ad content. In various embodiments, the measurement component may measure an aggregate duration; for example it may measure the aggregate time that the video ad was more than 50% in view on the device screen. In some embodiments, the measurement component may measure several visibility durations, e.g.: 1) total time the video ad was in view; 2) total time the video ad was in view more than 50%; 3) total time the video ad was 100% in view, etc. In various embodiments, the measurement component may calculate these three durations at the occurrence of every tracking event.

The description above with respect to FIG. 9 is one example of an implementation consistent with the invention. Another way to implement or embody the disclosed functionality is within the video ad itself. Such embodiments may be appropriate where the video ad is an executable video—e.g., an interactive video or rich-media video. For example, Flash™ videos are executables, and the functionality described may be included in the video file, where it will be executed by the Flash™ video player. For example, executable initialization code may be wrapped around (or, alternatively, included within) a video ad, such that when the video ad is played in a Flash™ player, the initialization wrapper code will perform functions as described above, such as inject a measurement component into the web page in proximity to the player, measure the visibility of the player at specified tracking events (e.g., start, midpoint, end or other fee-paid events), etc., as described above. In other embodiments the measurement component and the initialization component may both be incorporated directly within the video ad file. The tracking events may be detected by the initialization wrapper code, and an advertiser may specify events as desired to be built into the wrapper code. In such embodiments, there is no video ad file to be parsed.

The disclosed embodiments are also not limited to video advertisements, but may be used in any situation in which it is desirable to determine the visibility of video content, such as an animated image or animated vector object, on a device screen or application window with such content, whether in connection with a mobile application, a web browser, or a different application that is running locally on a client device. Moreover, the disclosed embodiments are also not limited to measuring visibility information, but may be used to measure any information regarding video content, such as user interaction information. Further, the invention is not limited to any particular open systems interconnection (OSI) layer; rather, any suitable application, presentation, session transport, network, data link, or physical protocol may be used, whether as part of the OSI model or as a standalone protocol.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention.

Likewise, the steps described need not be performed in the same sequence discussed or with the same degree of separation. Various steps may be omitted, repeated, combined, or divided, as necessary to achieve the same or similar objectives or enhancements. Accordingly, the invention is not limited to the above-described embodiments, but instead is defined by the appended claims in light of their full scope of equivalents.

Certain embodiments can be implemented as or using a computer program or set of programs. The computer programs can exist in a variety of forms both active and inactive. For example, the computer programs can exist as software program(s) comprised of program instructions in source code, object code, scripts, executable code or other formats, firmware program(s), or hardware description language (HDL) files. Any of the above can be embodied on a non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Certain embodiments can utilize or include a computer system, which may include one or more processors coupled to random access memory operating under control of or in conjunction with an operating system. The processors may be included in one or more servers, clusters, or other computers or hardware resources, or may be implemented using cloud-based resources. The processors may communicate with persistent memory, which may include a hard drive or drive array, to access or store program instructions or other data. The processors may be programmed or configured to execute computer-implemented instructions to perform the techniques disclosed herein.

What is claimed is:

1. A computer-implemented method for measuring visibility information associated with video content played by a video player incorporated into a webpage, the method comprising:
receiving first metadata associated with first video content;
receiving second metadata associated with second video content;

determining that the first metadata comprises a measurement flag that indicates occlusion of the video player that is viewable on a display presenting the webpage;
determining that the second metadata does not comprise the measurement flag;
executing, in response to the first metadata being determined to comprise the measurement flag, an initialization component associated with the video player;
initializing, by the initialization component, a measurement component associated with the video player; and
measuring, by the measurement component, visibility information associated with the first video content but not with the second video content, when the first and second video content are played.

2. The method of claim 1, wherein:
at least the first metadata includes one or more event callback instructions associated with the first video content; and
determining that the first metadata comprises the measurement flag comprises determining that at least one of the one or more event callback instructions comprise the measurement flag.

3. The method of claim 2, further comprising:
playing, by the video player, the first and second video content; and
executing, by the video player, the one or more event callback instructions when one or more events occur in relation to the first video content.

4. The method of claim 3, wherein measuring the visibility information associated with the first video content comprises measuring the visibility information associated with the first video content when the at least one event callback instruction including the measurement flag is executed.

5. The method of claim 3, wherein the one or more events comprise different percentages each related to a duration of video content being played by the video player.

6. The method of claim 3, wherein executing the one or more event callback instructions comprises requesting, in response to the determination that an event occurred during playback of video content, a uniform resource identifier (URI) associated with the event.

7. The method of claim 1, wherein the video player is inaccessible by a third party that generated one or more of the first and second video content.

8. The method of claim 1, wherein the execution of the initialization component causes a downloading of the measurement component from a measurement code server.

9. The method of claim 8, wherein initializing the measurement component associated with the video player comprises inserting the measurement component in a Document Object Model tree associated with the webpage.

10. The method of claim 1, wherein measuring the visibility information associated with the first video content comprises determining whether the video player is occluded or fully viewable on a display presenting the webpage.

11. The method of claim 10, wherein determining whether the video player is occluded or fully viewable on the display presenting the webpage comprises receiving a size and an offset of the video player playing the first video content.

12. The method of claim 11, wherein receiving the size and the offset of the video player playing the first video content comprises receiving an indication of whether the first video content is being played in full-screen mode.

13. The method of claim 10, wherein determining whether the video player is occluded or fully viewable on the display presenting the webpage comprises determining whether the video player playing the first video content is at least 50% in view on the display.

14. The method of claim 10, wherein determining whether the video player is occluded or fully viewable on the display presenting the webpage comprises measuring a duration of time that the video player playing the first video content was fully viewable on the display.

15. The method of claim 1, further comprising forwarding the measured visibility information associated with the first video content played by the video player to a measurement server.

16. The method of claim 1, wherein the first metadata is within a file generated in accordance the Video Ad Serving Template (VAST) protocol or the Video Player-Ad Interface Definition (VPAID) protocol.

17. The method of claim 1, wherein the first video content is played by the video player before the second video content is played by the video player.

18. The method of claim 1, wherein the first video content is played by the video player after the second video content is played by the video player.

19. A system for measuring visibility information associated with video content played by a video player incorporated into a webpage, the system comprising:
a client device comprising the video player that plays a first video content and second video content; and
a measurement code server, communicably connected to the client device, the measurement code server providing visibility measurement code that is executed by the client device, the visibility measurement code causing the client device to perform operations comprising:
receiving first metadata associated with the first video content;
receiving second metadata associated with the second video content;
determining that the first metadata comprises a measurement flag that indicates occlusion of the video player that is viewable on a display presenting the webpage;
determining that the second metadata does not comprise the measurement flag;
executing, in response to the first metadata being determined to comprise the measurement flag, an initialization component associated with the video player;
initializing, by the initialization component, a measurement component associated with the video player; and
measuring, by the measurement component, visibility information associated with the first video content but not with the second video content, when the first and second video content are played.

* * * * *